United States Patent
Passaglia et al.

(10) Patent No.: US 9,294,587 B1
(45) Date of Patent: Mar. 22, 2016

(54) ENHANCED ROUTING AND CONTENT DELIVERY

(71) Applicant: Amazon Technologies, Inc., Reno, NV (US)

(72) Inventors: Abraham Martin Passaglia, Seattle, WA (US); Jason George McHugh, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 236 days.

(21) Appl. No.: 13/793,598

(22) Filed: Mar. 11, 2013

(51) Int. Cl.
*G06F 15/16* (2006.01)
*H04L 29/06* (2006.01)

(52) U.S. Cl.
CPC .................................... *H04L 67/42* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 6,226,684 B1* | 5/2001 | Sung | ...................... | H04L 29/06 709/203 |
| 6,665,705 B1* | 12/2003 | Daniels-Barnes | ...... | H04L 29/06 709/203 |
| 6,721,804 B1* | 4/2004 | Rubin | ............... | G06F 17/30873 707/E17.111 |
| 7,209,977 B2* | 4/2007 | Acharya et al. | ............... | 709/240 |
| 7,388,839 B2* | 6/2008 | Chafle | ................. | H04L 12/5695 370/236 |
| 7,546,284 B1* | 6/2009 | Martinez | ........... | G06F 17/30336 |
| 8,473,620 B2* | 6/2013 | Demmer | ................. | H04L 41/12 709/227 |
| 2002/0120629 A1* | 8/2002 | Leonard | ........................ | 707/100 |
| 2004/0148365 A1* | 7/2004 | Tripathi | ............ | G06F 17/30902 709/218 |
| 2005/0198261 A1* | 9/2005 | Durvasula | ........... | H04L 12/5695 709/224 |
| 2011/0161400 A1* | 6/2011 | Silyaev et al. | ................. | 709/203 |
| 2013/0166703 A1* | 6/2013 | Hammer et al. | .............. | 709/220 |
| 2014/0164645 A1* | 6/2014 | Palani | ........................... | 709/242 |

* cited by examiner

*Primary Examiner* — Alicia Baturay
(74) *Attorney, Agent, or Firm* — Novak Druce Connolly Bove + Quigg LLP

(57) ABSTRACT

A routing device can maintain a long-lived, bidirectional connection with a network server. The routing device can establish a TCP connection with each of multiple computing devices. One or more computing devices can make (e.g., HTTP) requests for network resources. The routing device can receive the requests and decide to direct the requests to the network server via the long-lived, bidirectional connection. Based on the requests, the network server can make requests to other servers for the resources and send modified (e.g., assembled, filtered, optimized, etc.) responses back to the routing device, which can transmit the responses to the computing devices. This process can be transparent to the computing devices. In some embodiments, the routing device can optionally establish a long-lived TCP connection with a computing device capable of the long-lived TCP connection option. The routing device can maintain the long-lived connection with the network server for the computing device.

25 Claims, 9 Drawing Sheets

ENHANCED ROUTING AND CONTENT DELIVERY

BACKGROUND

Computing devices are often used to communicate over a network such as the Internet. To access the Internet, computing devices typically have to connect to a router (which can be connected to a modem or networking device(s) for accessing the Internet). Conventionally, when a computing device makes a request for a website (or other network resource), the router directs the request from the computing device to a web server hosting the website. The computing device communicates (via the router) with the web server hosting the website to obtain data associated with the website in order to satisfy the request. Having obtained the data, the computing device can process and utilize the data (e.g., render the website using the data associated with the website). However, having the computing device communicate with the web server can result in increased latency and increased power consumption for the computing device. Moreover, the data associated with the website can be provided by multiple web servers such that the computing device will have to communicate with the multiple web servers in order to obtain the data, thereby further increasing latency and power consumption for the computing device. For example, the computing device communicates with a web server hosting a website requested by the device. The web server sends a response back to the computing device indicating that there are additional data/resources associated with the website that need to be retrieve from additional web servers that host the additional data/resources. The computing device has to make separate requests to each of the additional web servers to retrieve the additional data/resources in order to get and appropriately render the requested website. This can cause data transmission errors, network slowness, reduced network responsiveness, reduced battery life, etc., thereby decreasing the overall user experience.

BRIEF DESCRIPTION OF THE DRAWINGS

Various embodiments in accordance with the present disclosure will be described with reference to the drawings, in which.

DETAILED DESCRIPTION

Figure 1:
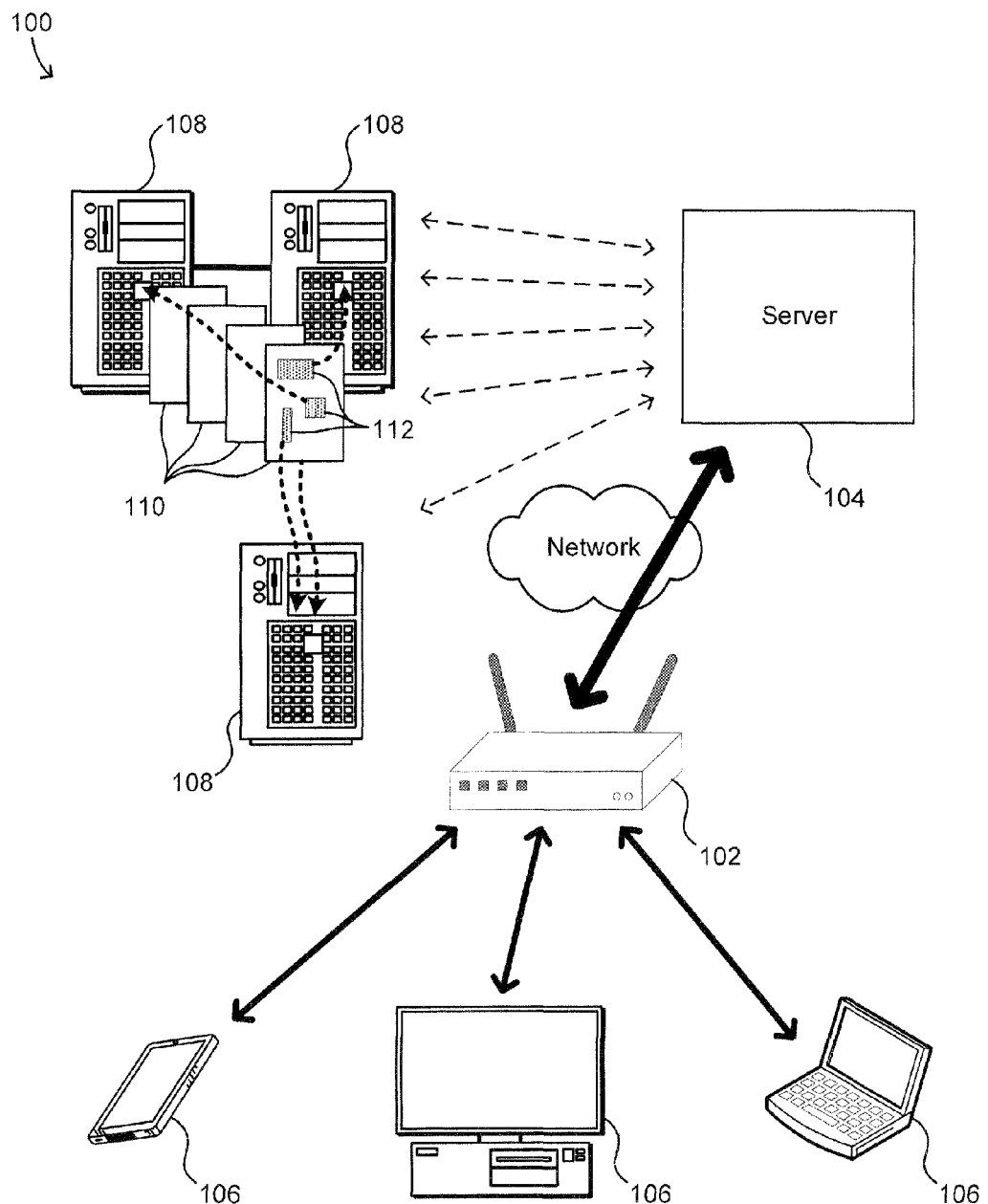
FIG. 1 illustrates an example environment in which aspects of the various embodiments can be utilized.

Systems and methods in accordance with various embodiments of the present disclosure overcome one or more of the above-referenced and other deficiencies in conventional approaches to managing communications in a networked environment. In particular, various embodiments of the present disclosure can establish a connection with a network server, which can process network resource requests from computing devices and provide responses.

At least some embodiments enable a routing device to communicate with a network server over a network such as the Internet. There can be software installed and running on the routing device to maintain (i.e., establish, sustain, etc.) a connection with the network server. The connection between the routing device and the network server can be a long-lived (i.e., persistent, always-on, etc.), bidirectional connection having a specified long-lived/long-term lifespan (e.g., one year, two years, forever, indefinite, etc.). In some embodiments, software on the routing device and on the network server can allow the connection to utilize a specified network protocol (e.g., data transport protocol) for improved data transmission. In some embodiments, the routing device can support multiplexing and demultiplexing communications for multiple devices or requests over a single connection.

There can also be at least one computing device request to establish a transmission control protocol (TCP) connection with the routing device. Once the TCP connection is established, the routing device can receive from the at least one computing device a request for a network resource, such as a webpage. The routing device can utilize internal logic to decide whether to direct the request to be handled by the network server or to handle the request normally (e.g., direct the request to the targeted network resource without involving the network server).

In some embodiments, the routing device can decide to direct the request through the long-lived, bidirectional connection to the network server for processing, for example, because the network server can have more resources (e.g., processing power, battery life, etc.) than the at least one computing device. The network server can communicate with the requested/targeted network resource (and any sub-resources) to retrieve data related to the network resource (and any sub-resources). The network server can prepare (e.g., configure, assemble, modify, etc.) the data and deliver the data back to the routing device, which can deliver the data back to the at least one computing device that made the request. This process can be transparent to the at least one computing device. In one example, the at least one computing device can make a standard hypertext transfer protocol (HTTP) request and receive a response without knowledge or awareness that the request was processed and a response delivered by the network server. Moreover, any computing device that is connected to the routing device can utilize the network server; the computing device does not need special code/software. In addition, a plurality of computing devices connected to the routing device can utilize the network server concurrently because the software on the routing device and/or on the network server can support multiplexing and demultiplexing multiple requests.

In conventional approaches, if a computing device wants to keep a connection open to a back-end server, the device has to periodically send data to the server and receive a response from the server. The data can be considered a "heartbeat" sent from the device to the back-end server indicating that the device wants to keep the connection open. The heartbeat data can be sent from the device via a router and the response from the server can also be received via the router by the device. The heartbeat data and response prevents the router (or other networking device) from terminating the connection among the device, the router, and the back-end server, which can happen when no data is transmitted over the connection for an extended period of time.

In various embodiments of the present disclosure, a routing device can optionally establish a long-lived TCP connection with a computing device(s) capable of supporting the long-lived TCP connection option. For example, the routing device and the computing device(s) can have special code/software to enable the optional long-lived TCP connection; in other words, the routing device can be specially configured and the device(s) can contain a special TCP extension, which enables the optional long-lived TCP connection. Having enabled the long-lived TCP connection option, the device can maintain the TCP connection with the routing device without the device having to periodically send heartbeat data; instead, the routing device can send "heartbeats" periodically to the network server on the device's behalf indicating the device wants to keep the connection with the network server open. In some embodiments, the routing device can create an entry for the computing device(s) in a routing table and give the entry a long-lived lifespan (e.g., one year, two years, forever, indefinite, etc.).

The long-lived TCP can have the additional advantage of reducing even further the power consumption and latency required for the TCP connection between the computing device and the routing device, because the computing device would no longer have to pay costs associated with sending heartbeat data continuously to the network server (because the routing device will handle the sending of the heartbeat data) and/or costs associated with re-establishing TCP connections with the routing device. It is contemplated that the long-lived TCP connection is optional such that computing devices having a standard (non-long-lived) TCP connection to the routing device can still utilize the network server. In some embodiments, the routing device can maintain an internal mapping of what devices are connected and what outstanding connections or requests the routing device can have for them.

In one example, when a request is made by a computing device and a network resource is retrieved, there can be a cost associated with the overhead of establishing a TCP connection through the routing device, in addition to the cost of sending the HTTP request and receiving the HTTP response. Various embodiments of the present disclosure can mitigate this cost and/or other costs.

In another example, when the request(s) by the computing device(s) leads to communication with multiple web servers for different network resources (e.g., different webpage elements, each hosted by a different web server), latency and power consumption is increased. Various embodiments of the present disclosure can also mitigate these and/or other negative effects. For example, the network server can perform various tasks, including handling communications with the multiple web servers for the different network resources, to reduce latency and power consumption on the computing device(s).

Various other functions and advantages are described and suggested below as may be provided in accordance with the various embodiments.

FIG. 1 illustrates an example environment 100 in which aspects of the various embodiments can be utilized. The example environment 100 can comprise a routing device 102, a network server 104, one or more computing devices 106, one or more web servers 108, one or more contents 110 provided by the one or more web servers 108, and one or more components/elements 112 within the one or more contents 110. The routing device 102 can be any device that forwards data packets throughout one or more computing networks. For example, the routing device 102 can include (but is not limited to) a wireless router, wired router, access point, etc. At least some embodiments of the present disclosure can be implemented using at least in part the network server (i.e., backend server) 104.

Conventional approaches typically enable a router to receive requests from computing devices and then route the requests to the targeted/requested network resources. A targeted/requested network resource (e.g., webpage) can contain components and/or sub-resources (e.g., ads, widgets, media, etc.) that need to be retrieved, configured, and/or assembled together in order to utilize the network resource properly (e.g., in order to render the webpage properly). In some embodiments, the components/sub-resources can be located on or hosted by a web server 108 (e.g., a third-party server that is different from the network server 104), such that computing devices needing the components/sub-resources have to connect to the web server 108 (e.g., third-party server external to the network server 104). However, this can require the computing devices themselves to retrieve (e.g., from the web server 108), configure, and/or assemble the components/sub-resources, which can increase error rates, latency, and power consumption on the computing devices.

Instead, various embodiments of the present disclosure can maintain at least one long-lived (i.e., persistent, always-on, etc.), bidirectional connection between the routing device 102 and the network server (i.e., backend server) 104 to tunnel network resource (e.g., web page, HTTP, etc.) requests from the computing device(s) 106 through the long-lived connection to the network server 104. In other words, instead of making the computing device(s) 106 perform the retrieving, configuring, and/or assembling of any sub-resources included with the requested network resource(s), the network server 104 can retrieve, configure, and/or assemble any sub-resources and then provide/deliver to the computing device(s) 106 the requested network resource(s) with the sub-resources retrieved, configured, and/or assembled. In some embodiments, there can be software installed and running on the network server 104 including logic for determining how to process requests coming over the connection. For example, the software on the network server 104 can facilitate in determining how to retrieve, configure, assemble, etc., some or all of the sub-resources included in the request network resource(s). In another example, the network server 104 can decide to provide/deliver/return a cached copy(ies) of the requested network resource(s), if available.

The network server (i.e., backend server) 104 can be one or more computer systems dedicated to performing one or more services. The routing device 102 can communicate with the network server 104 over a network, such as the Internet. The routing device 102 can maintain (i.e., establish and retain) at least one bidirectional connection with the network server (i.e., backend server) 104 over the network (e.g., Internet). For example, software can be installed and running/executing on the routing device (e.g., commercial router) 102 such that the routing device 102 knows about the existence of the network server 104. The software can be installed on any routing device and thus can cause any routing device (e.g., commercial wireless routers) 102 to maintain (i.e., establish and retain) at least one bidirectional connection with the network server 104. Similarly, software can be installed on the network server 104 such that the network server 104 knows to cooperate with the routing device 102.

In some embodiments, the bidirectional connection between the routing device 102 and the network server 104 can be long-lived (e.g., kept active for a specified long-lived period of time), persistent, or "always on," such that the connection is continuously kept active. In some embodiments, the connection may or may not be encrypted and/or compressed based on variables such as network characteristics, the nature of the request, the intended destination, and other variables.

In some embodiments, the at least one connection between the routing device 102 and the network server 104 can utilize a particular data transport protocol (i.e., a specified data transport protocol). The data transport protocol can be a networking protocol for transporting data, such as data packets, web content, etc. In some embodiments, the data transport protocol can be any bidirectional, long-lived network communication protocol. The data transport protocol can increase the efficiency of data transmission, such as by reducing the time needed to access and/or utilize network resources (e.g., reducing webpage load time). For example, the data transport protocol can prioritize and multiplex the transfer of web page sub-resources so that only one connection per client (e.g., computing device 106) is required.

As shown in FIG. 1, one or more computing devices 106 can be connected to the routing device 102 (e.g., WiFi). As discussed above, software can be installed on any routing device (e.g., commercial routing devices) 102 to maintain (i.e., establish and maintain) the connection between the routing device 102 and the network server 104. The computing devices 106 can make requests for network resources (e.g., web content requests, hypertext transfer protocol (HTTP) request, etc.) via the routing device 102. The (software on the) routing device 102 can include logic for determining/deciding how to process the requests from the computing device(s) 106. For example, the routing device 102 can decide to direct the requests from the computing device(s) 106 to the network server 104 via the bidirectional connection such that the requests are to be handled by the network server 104, or if need be, the routing device 102 can decide to handle the requests normally (e.g., directing the requests to the network resources at which the requests were targeted, without involving the network server 104).

Moreover, in some embodiments, the (software on the) routing device 102 can include logic for supporting multiplexing and demultiplexing on the connection such that multiple computing devices 106 connected to the routing device 102 can utilize the network server 104 via the connection. The (software on the) routing device 102 can include logic for multiplexing requests such that multiple requests from multiple computing devices 106 can be handled and transmitted to the network server 104 concurrently. In some embodiments, however, multiplexing/demultiplexing is not necessary and the (software on the) routing device 102 can decide to establish one connection to the network server 104 for each connected computing device.

Data provided/delivered by the network server 104 in response to the requests can be received in any order by the routing device 102 and can be automatically delivered to the correct requesting computing device. As such, one or more computing devices 106 can utilize the network server 104 without having to add any special code to any of the computing devices 106, as long as the computing devices 106 are connected to the routing device 102 (e.g., WiFi). Also, any computing device 106 connected to the routing device 102 can utilize the network server 104 without restrictions/limitations on which web browser(s) the computing device 106 can use.

In one example, the routing device 102 can have knowledge of or be aware of the network server 104 and can maintain (i.e., establish and sustain) at least one long-lived connection with the network server 104. The at least one connection can utilize a specified data transfer protocol to improve the efficiency of data transmission. A computing device can be connected to the routing device 102 to access the Internet. The computing device can make an HTTP request for a webpage 110 hosted by a web server 108. The webpage 110 can include various components 112, such as ads, media files, applets, etc., which can be hosted by web servers other than the web server hosting the webpage 110. In accordance with the various embodiments of the present disclosure, instead of having the computing device retrieve the various components 112 from the other web servers and then having the computing device configure and assemble the components 112 in order to render the webpage 110 appropriately, the HTTP request from the computing device can be routed by the routing device 102 to the network server 104 via the connection. The network server 104 then handles and/or processes the HTTP request. The network server 104 can, for example, retrieve, configure, assemble, etc., the components 112 of the webpage 110 and deliver/provide the webpage 110 (with the components 112 retrieved, configured, assembled, etc.) back to the computing device via the connection with the routing device 102.

Continuing with the preceding example, in some embodiments, the network server 104 can modify the webpage 110 to improve the handling/processing (e.g., downloading, rendering, etc.) of the webpage 110 on the computing device. For example, the network server 104 can have logic for deciding to reduce the resolution and size of a media file (e.g., audio, picture, video, etc.) included in the webpage 110 such that the computing device can download and render the webpage 110 within a reasonable amount of time (and with a reasonable level of quality for the media file). In another example, the network server 104 can decide to cache certain data such that if and when one or more computing devices request the data, the server 104 can deliver it efficiently. In a further example, the server 104 can maintain a list of insecure/undesired network resources (e.g., websites, web content, etc.) that are to be blocked from potentially being accessed by the computing device(s). These examples are only illustrative in nature and it is contemplated that there can be many other applications and embodiments consistent with the present disclosure that a person of ordinary skill in the art would recognize.

Figure 2:
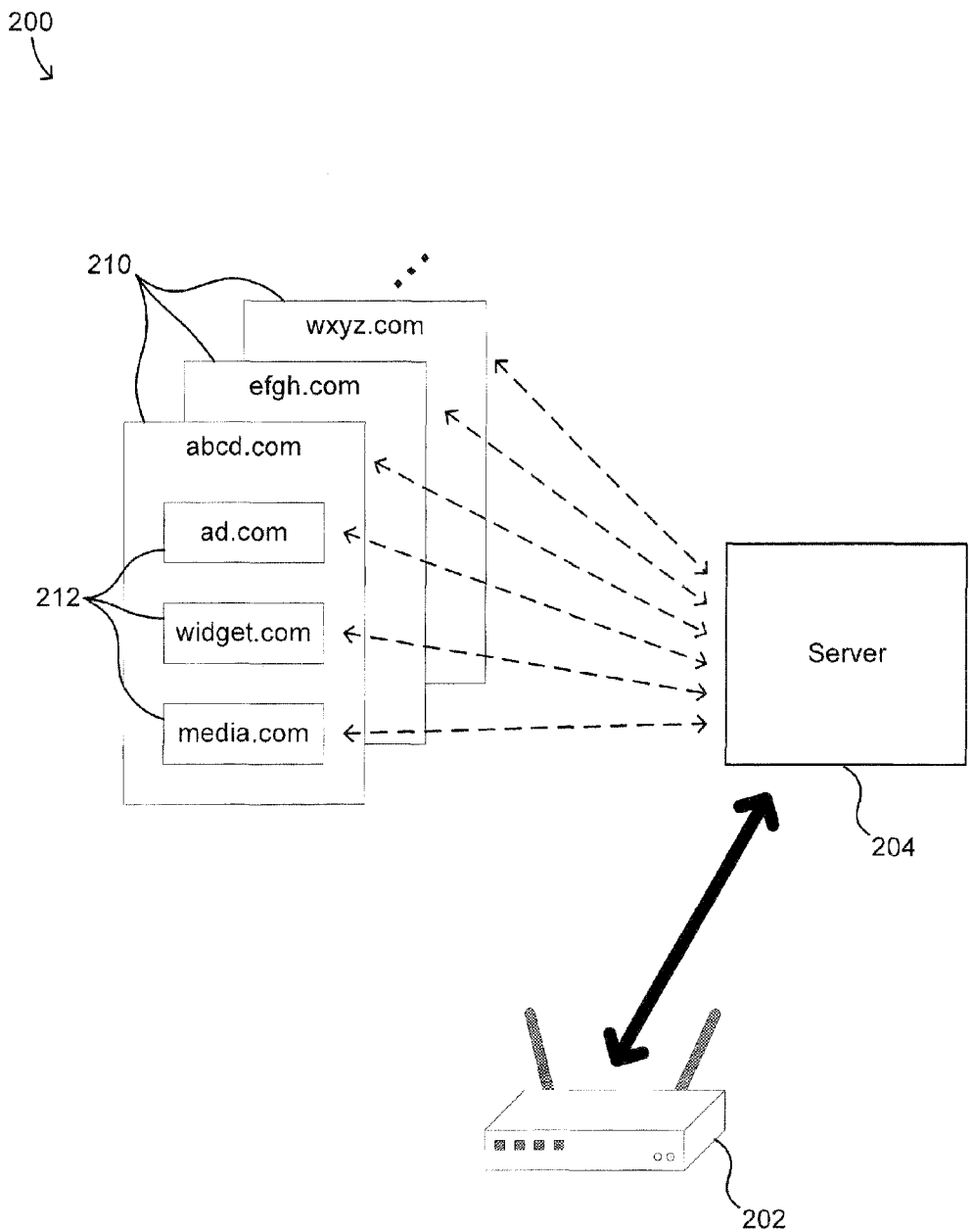
FIG. 2 illustrates an example system embodiment for enhanced routing and content delivery.

FIG. 2 illustrates an example system embodiment 200 for enhanced routing and content delivery. The example system embodiment 200 can comprise a routing device 202 and a network server (i.e., backend server) 204. The routing device 202 can be running software that enables the routing device 202 to maintain a connection with the network server 204. The connection can be a long-lived, bidirectional connection. The network server 202 can also be running software that enables the maintaining of the connection.

In some embodiments, the routing device 202 can receive a request for a network resource, for example, from a computing device (not shown in FIG. 2) connected to the routing device 202. For example, the request can be an HTTP request for a webpage 210, such as a homepage for abcd.com. The webpage abcd.com 210 can include sub-resources/components 212, such as advertisements provided by ad.com, widgets (e.g., applets, scripts, etc.) provided by widget.com, and/or media files (e.g., audio clips, pictures, video clips, etc.) provided by media.com. Instead of routing the request from the computing device to abcd.com and having the computing device communicate with ad.com, widget.com, and/or media.com to retrieve the sub-resources of abcd.com, the routing device 102 can route the request to the network server 204. The network server 204 can have software to recognize and process/handle the request. For example, the network server 204 can communicate with abcd.com and retrieve, configure, assemble, etc., the sub-resources from ad.com, widget.com, media.com, etc. Then the network server 204 can deliver/provide the webpage (i.e., in the form of webpage data packets) abcd.com 210 and the retrieved/configured/assembled sub-resources 212 back to the computing device via the connection with the routing device 202. This process can be transparent to the computing device; in other words, the computing device can make HTTP requests and receive data normally (without knowledge/awareness of the network server 204 and/or how the network server 204 processes the requests).

Moreover, the network server 204 can concurrently handle/process multiple requests from multiple computing devices for multiple network resources (e.g., abcd.com, efgh.com, wxyz.com) 210 and sub-resources 212. In some embodiments, the network server 204 can have logic for deciding to modify network resources (and sub-resources) delivered back to the computing devices. For example, the network server 204 can decide to filter out specified (inappropriate) content, such as undesired content including (but not limited to) potential viruses, spyware, malware, undesired ads, etc., from the network resources (and sub-resources) to be delivered back. Specified (inappropriate) content can also include unauthorized content such as material that a guardian (e.g., parent) wants to prevent a ward (e.g., child) from accessing. In another example, the network server 204 can decide to reduce (or increase if viable) the quality of content requested (e.g., pictures/videos on a webpage) such that the computing devices can better handle/process the content delivered back (e.g., faster downloading and rendering of the content).

Figure 3:
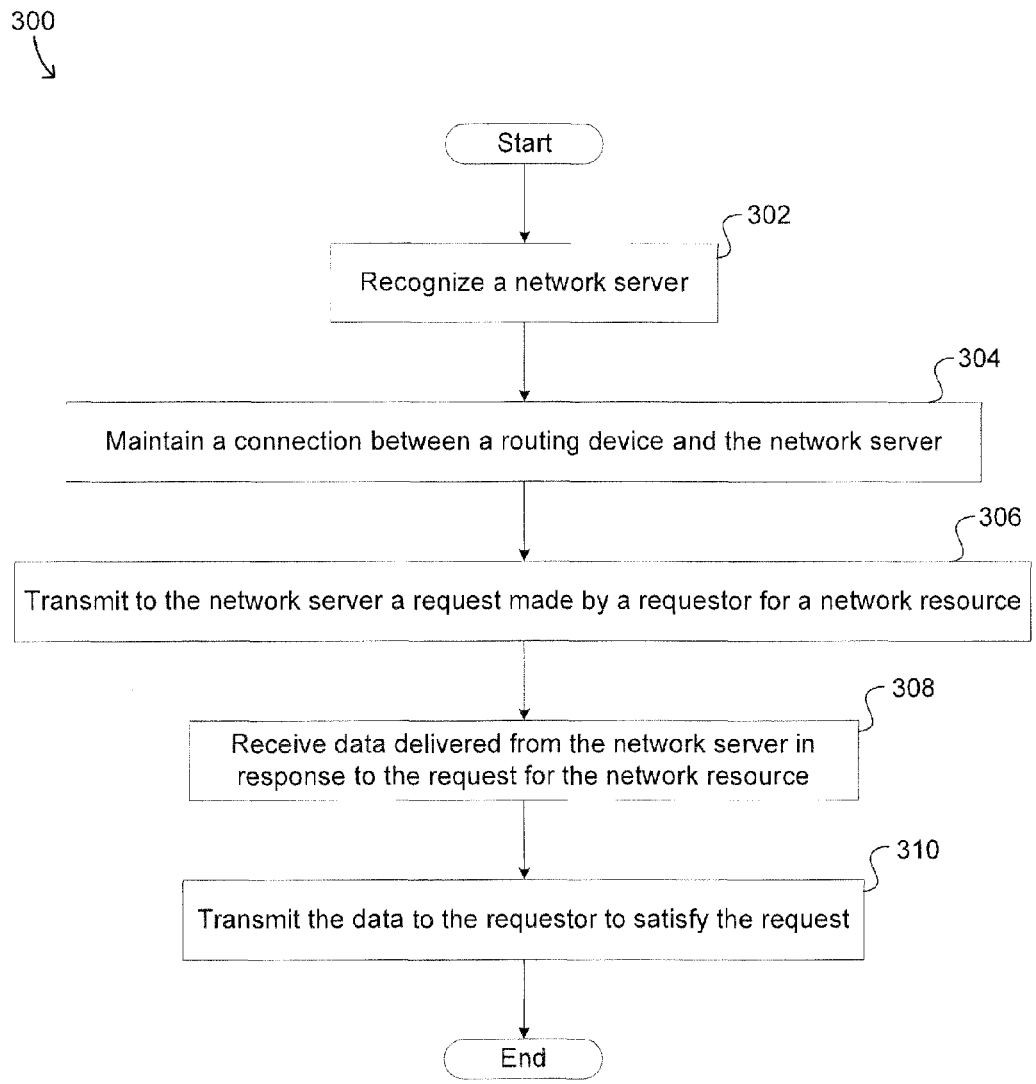
FIG. 3 illustrates an example method embodiment for enhanced routing and content delivery.

FIG. 3 illustrates an example method embodiment 300 for enhanced routing and content delivery. It should be understood that there can be additional, fewer, or alternative steps performed in similar or alternative orders, or in parallel, within the scope of the various embodiments unless otherwise stated. The example method embodiment 300 of FIG. 3 can illustrate how a routing device and a network server can work together in some embodiments.

The example method 300 can start with recognizing, by the routing device, the existence of the network server (i.e., back-end server), at step 302. Step 304 can including maintaining (i.e., establishing and sustaining) a long-lived, bidirectional connection between the routing device and the network server. In some embodiments, the connection can utilize a specified network protocol (e.g., data transfer protocol) for improved data transmission.

At step 306, the example method 300 can transmit, from the routing device to the network server, a request made by a requestor (e.g., computing device) for a network resource. The network server can handle/process the request and provide/deliver data in response to the request. For example, the network server can, in response to the request, retrieve data associated with the requested network resource and deliver the data to the routing device. Step 308 can include receiving, at the routing device, the data delivered from the network server in response to the request. In some embodiments, the data delivered from the network server to be received at the routing device can include different pieces of data retrieved by the network server from different web servers (e.g., third-party web servers). Then step 310 can include transmitting the data from the routing device to the requestor (e.g., computing device) to satisfy the request.

Figure 4:
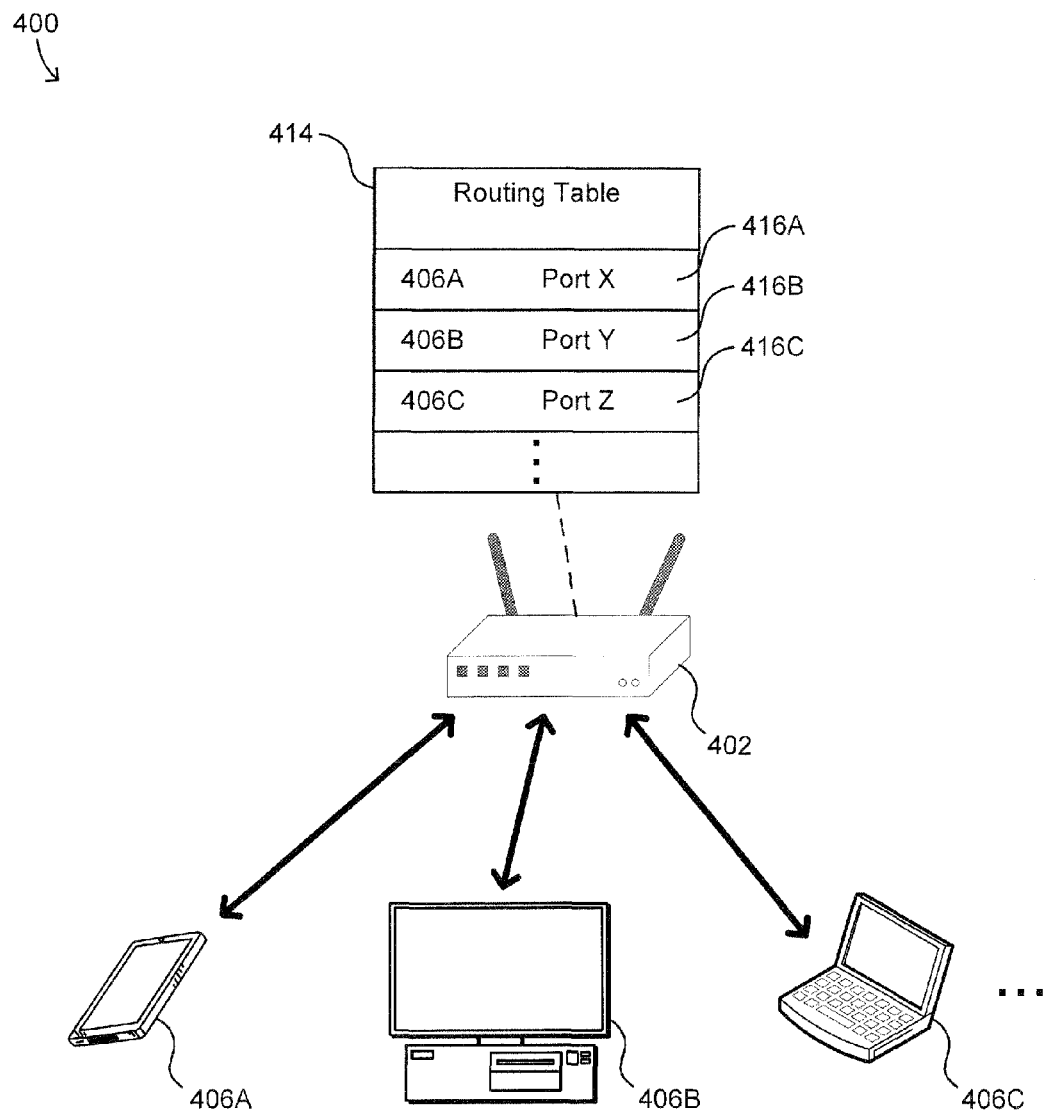
FIG. 4 illustrates an example system embodiment for enhanced routing and content delivery.

FIG. 4 illustrates an example system embodiment 400 for enhanced routing and content delivery. The example system embodiment 400 can comprise a routing device 402 and one or more computing devices (e.g., 406A, 406B, 406C, etc.). The one or more computing devices can connect to the routing device 402 and utilize the advantages of a long-lived connection between the routing device 402 and a network server (not shown in FIG. 4).

In some embodiments, the standard TCP (Transmission Control Protocol) can optionally be extended to support a long-lived TCP option which computing devices (e.g., 406A, 406B, 406C, etc.) capable of such an option can specify when connecting to the routing device 402. In some embodiments, this option can reduce (or eliminate) disconnections. For example, this option can facilitate in maintaining TCP connections alive, such that the amount, frequency, and/or likelihood, etc., of computing devices being disconnected from the routing device are reduced. In some embodiments, this long-lived TCP option can reduce having to constantly reconnect computing devices (e.g., 406A, 406B, 406C, etc.) to the routing device when there are disconnections. For example, to enable the long-lived TCP option, a computing device 406A capable of such an option can transmit a signal, indicating desire to enable the long-lived TCP option, to the routing device 402 along with a unique identifier for the computing device 406A and some tuning information (e.g., how long to keep the connection alive between the computing device 406A and the routing device 402). In response, the (software on the) routing device 402 can track/remember/keep the connection between the computing device 406A and the routing device 402 alive for an extended (i.e., long-lived) period of time (e.g., one year, two years, indefinite, forever, etc.).

In some embodiments, the (software on the) routing device 402 can track/remember/keep the connection(s) in a routing table 414. The routing device 402 can create an entry in the routing table 414 for each connection. For example, as shown in FIG. 4, computing device 406A can use Port X to communicate with the routing device 402 and the routing device 402 can create an entry 416A for tracking/remembering/keeping the connection with computing device 406A. Similarly, entries 416B and 416C can be created for connections with computing devices 406B and 406C, respectively. Each of the entries (e.g., 416A, 416B, 416C) in the routing table 414 can correspond to a unique identifier for a respective computing device (e.g., 406A, 406B, 406C).

Furthermore, the routing device 402 can guarantee that it does not track/remember/keep a number of connections exceeding a threshold amount/number of connections. This can prevent the routing device 402 from running out of memory or other resources. If the number of connections tracked/remembered/kept by the routing device 402 exceeds the threshold, then the routing device 402 can start to remove some of the connections, for example, by using a Least Recently Used algorithm, a First-In First-Out algorithm, and/or some other algorithm.

In some embodiments, the long-lived TCP option can have the advantage of reducing even further the power consumption and latency required for connections between computing devices (e.g., 406A, 406B, 406C) and the routing device 402, because the computing devices would no longer have to pay the cost of sending heartbeat data periodically to the network server and/or the cost of re-establishing TCP connections through the routing device 402. In some embodiments, computing devices (e.g., 406A, 406B, 406C) can be made capable of enabling the long-lived TCP option by running special code/software to support the TCP extension. Again, it is contemplated that the long-lived TCP option is optional such that computing devices without capability for the long-lived TCP option can still connect to the routing device 402 and utilizing the network server connected to the routing device 402.

Figure 5:
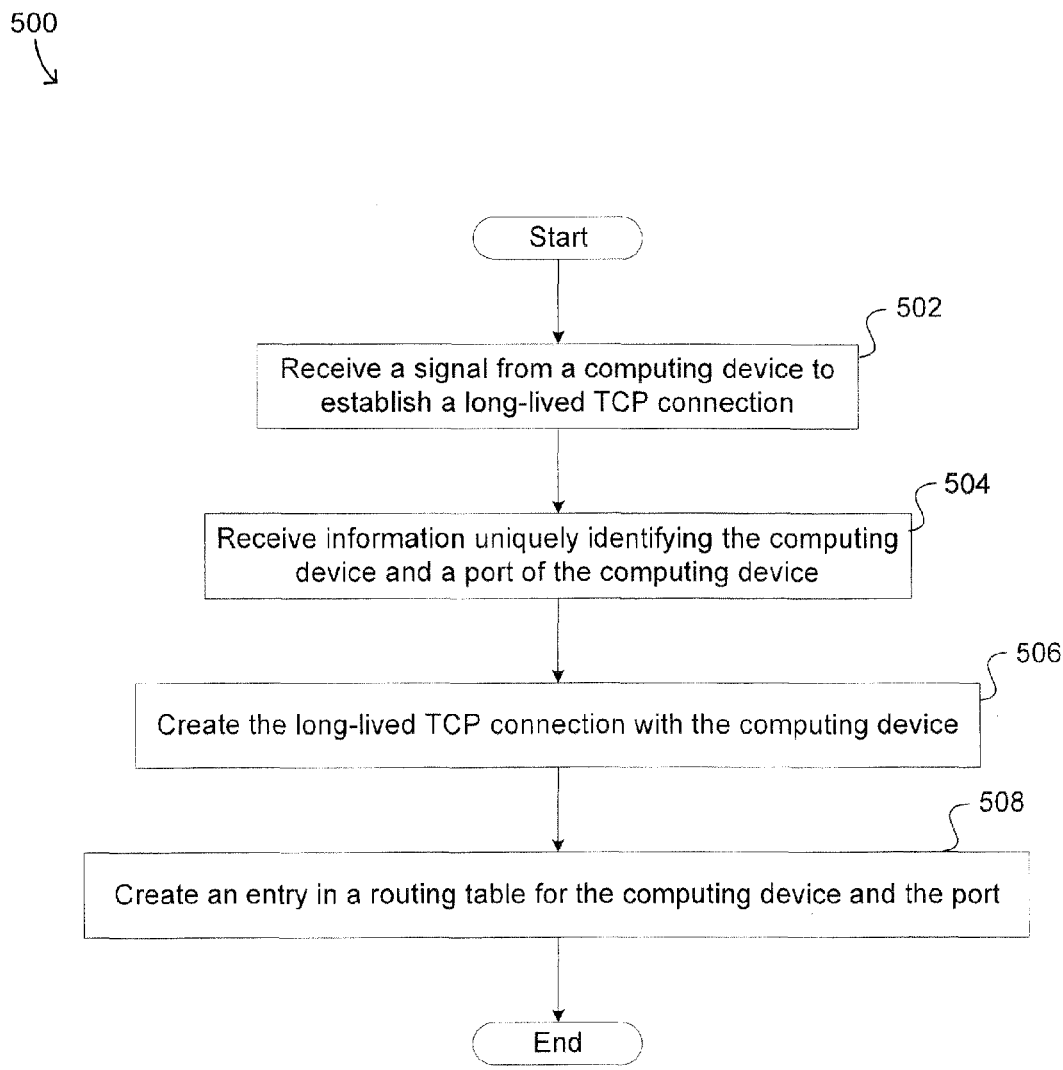
FIG. 5 illustrates an example method embodiment for enhanced routing and content delivery.

FIG. 5 illustrates an example method embodiment 500 for enhanced routing and content delivery. The example method embodiment 500 of FIG. 5 is directed to a routing device establishing a long-lived TCP connection with a computing device. Again, it should be understood that there can be additional, fewer, or alternative steps performed in similar or alternative orders, or in parallel, within the scope of the various embodiments unless otherwise stated. The example method embodiment 500 can start with receiving a signal from the computing device to establish the long-lived TCP connection, at step 502. At step 504, the example method 500 can receive information uniquely identifying the computing device and a port of the computing device. The port of the computing device can be a port to be utilized for the long-lived TCP connection between the computing device and the routing device.

Step 506 can include creating the long-lived TCP connection with the computing device. Then at step 508, the example method 500 can create an entry in a routing table for the computing device and the port. The entry for the computing device and the port can be created based at least in part on the information uniquely identifying the computing device and the port.

Figure 6A:
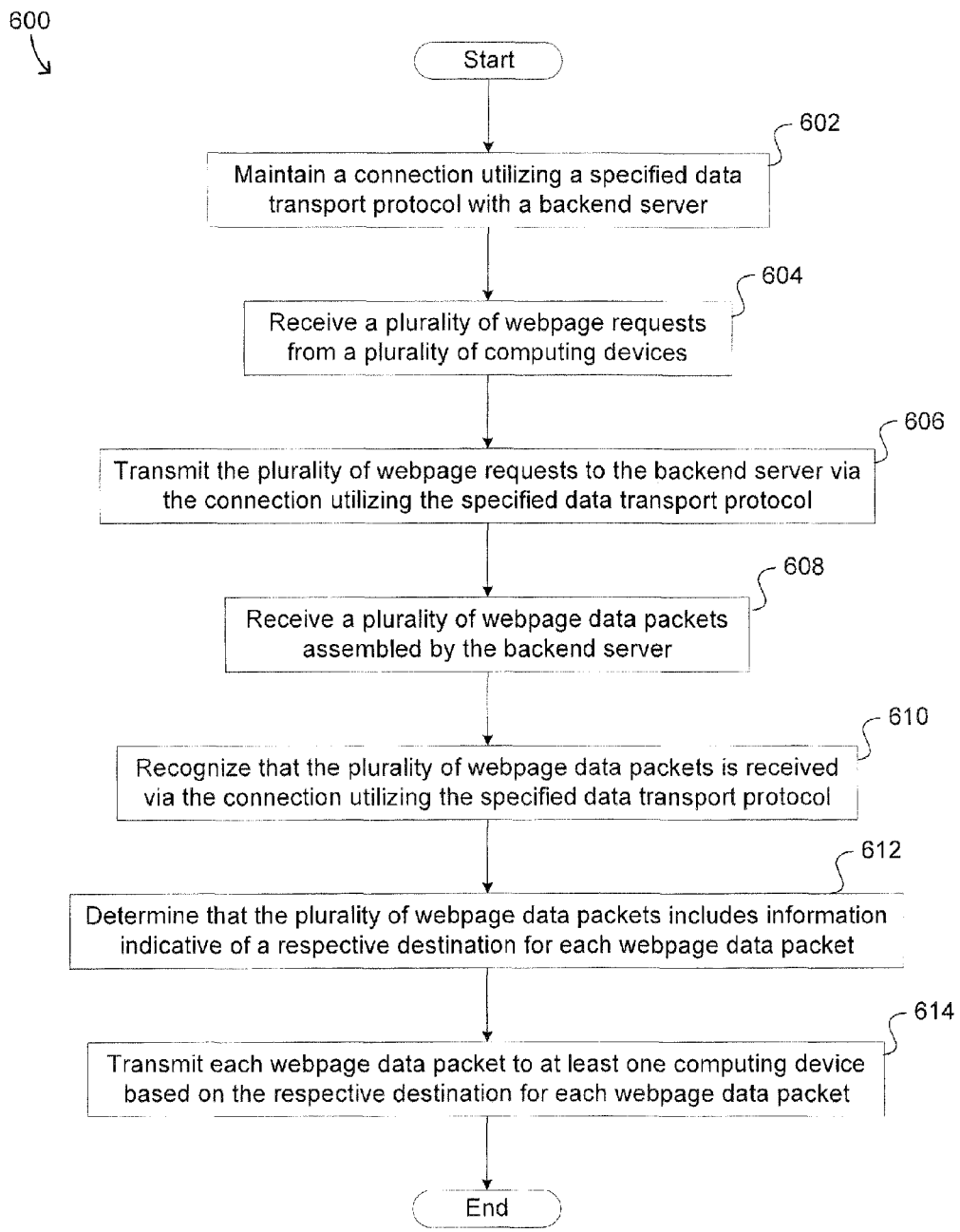
FIG. 6A illustrates an example method embodiment for enhanced routing and content delivery.

FIG. 6A illustrates an example method embodiment 600 for enhanced routing and content delivery. As discussed above, there can be additional, fewer, or alternative steps performed in similar or alternative orders, or in parallel, within the scope of the various embodiments unless otherwise stated. The example method embodiment 600 can start with maintaining a connection with a backend server, at step 602. The connection can utilize a specified data transport protocol. The example method 600 can receive a plurality of webpage requests, at step 604. In some embodiments, webpage requests can refer to requests over a network connection for data associated with a webpage. An example of a webpage request can include an HTTP request. Each webpage request can originate from one of a plurality of computing devices and each webpage request can include information indicative of an identification for a respective one of the plurality of computing devices from which each webpage request originates.

Step 606 can include transmitting the plurality of webpage requests to the backend server via the connection utilizing the specified data transport protocol. Step 608 can include receiving, from the backend server, a plurality of webpage data packets assembled by the backend server.

Then at step 610, the method 600 can recognize that the plurality of webpage data packets is received via the connection utilizing the specified data transport protocol. In response to the recognizing, the example method 500 can determine that the plurality of webpage data packets received via the connection utilizing the specified data transport protocol includes information indicative of a respective destination for each of the plurality of webpage data packets, at step 612. In some embodiments, rather than the information indicative of the respective destination(s) being included in the webpage data packets, the information can be maintained internally by a routing device such that the routing device can determine the respective destination for each of the plurality of webpage data packets. In some embodiments, the information indicative of the respective destination for each webpage data packet can be associated with identifying information (e.g., an identifier) for each webpage data packet. Step 614 can include transmitting each of the plurality of webpage data packets to at least one of the plurality of computing devices based at least in part on the information indicative of the respective destination for each of the plurality of webpage data packets.

Figure 6B:
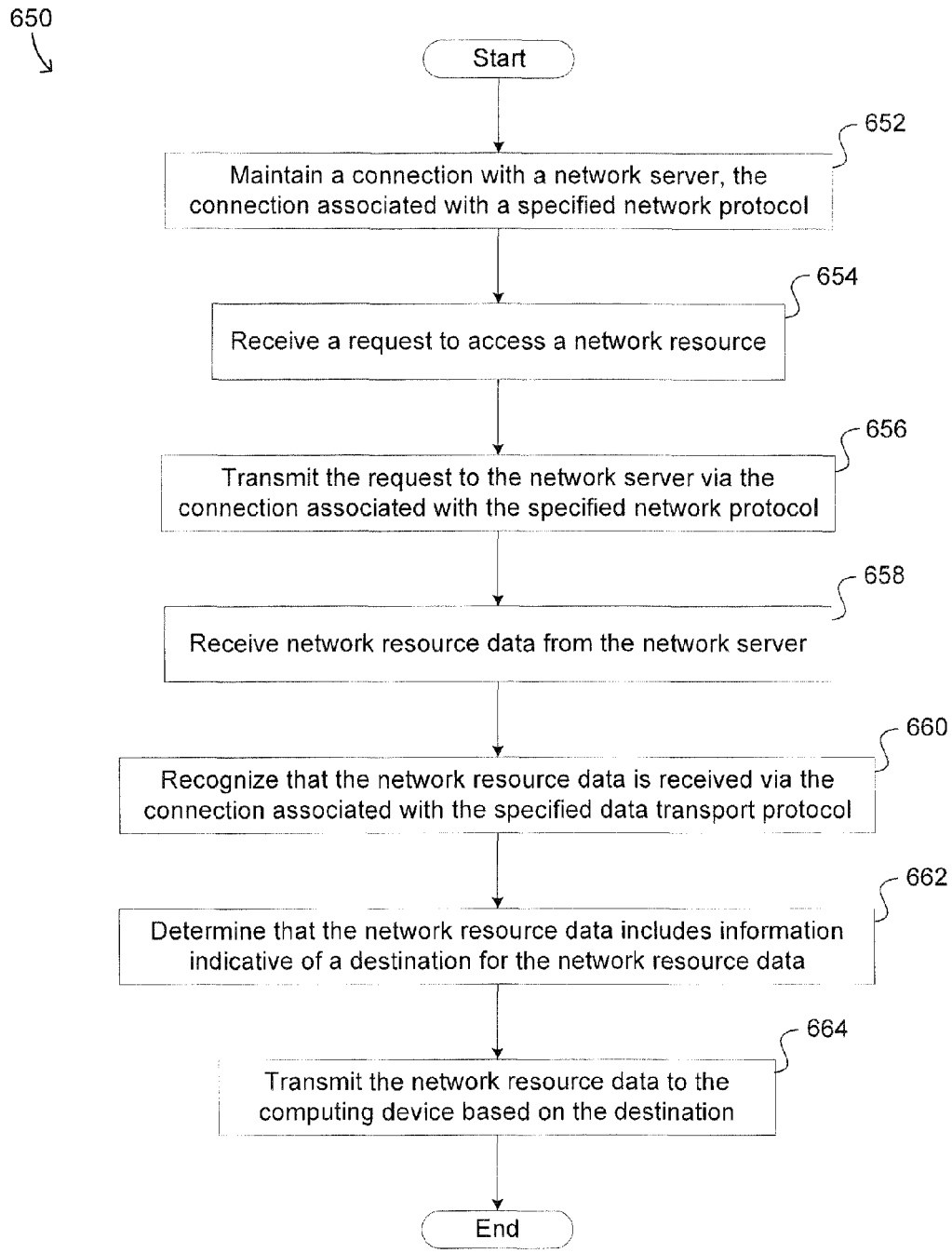
FIG. 6B illustrates an example method embodiment for enhanced routing and content delivery.

FIG. 6B illustrates an example method embodiment 650 for enhanced routing and content delivery. Again, there can be additional, fewer, or alternative steps performed in similar or alternative orders, or in parallel. At step 652, the example method embodiment 650 can maintain a connection with a network server. The connection can be associated with a specified network protocol. At step 654, the method 650 can receive, from a computing device, a request to access a network resource.

Step 656 can include transmitting the request to the network server via the connection associated with the specified network protocol. Then at step 658, the example method 650 can receive network resource data from the network server. At step 660, the example method 650 can recognize that the network resource data is received via the connection associated with the specified data transport protocol.

In response to the recognizing, the method 650 can determine that the network resource data received via the connection associated with the specified data transport protocol includes information indicative of a destination for the network resource data, at step 662. In some embodiments, rather than the information indicative of the destination for the network resource data being included in the network resource data, the information can be maintained by a routing device such that the routing device can determine the destination for the network resource data. In some embodiments, the information indicative of the destination for the network resource data can be associated with identifying information (e.g., an identifier) for the network resource data. Then at step 664, the method 650 can transmit the network resource data to the computing device based at least in part on the information indicative of the destination.

The various embodiments of the present disclosure can mitigate the impact of network slowness between the routing device and the Internet. For example, in environments where many computing devices are connecting to a routing device with a slow connection to the Internet (e.g., wireless Internet on an airplane), maintaining a single persistent connection between the routing device and a network server can significantly reduce the amount of connections that need to be established between the routing device and web servers on the Internet, thereby reducing latencies and improving performance for all computing devices.

In some embodiments, resources of the network server can be utilized more significantly. For example, the network server can use its resources, which can be significant compared to those of a computing device, to perform processing that the computing device would normally have to do itself, such as content layout. This can improve performance and reduce power consumption of the computing device.

In some embodiments, the network protocol (e.g., data transport protocol) can utilize the WebSocket standard. In some embodiments, the network protocol (e.g., data transport protocol) can utilize the SPDY™ protocol. It is contemplated that a person of ordinary skill in the art would recognize various other protocols can be utilized in accordance with various embodiments of the present disclosure.

Various embodiments consistent with the present disclosure can also be implemented for tunability and/or customization. For example, how the network server processes HTTP requests from computing devices can be tuned/customized based at least in part on parameters such as the destination being targeted, the content being requested, and/or characteristics of the HTTP requests, etc.

Figure 7:
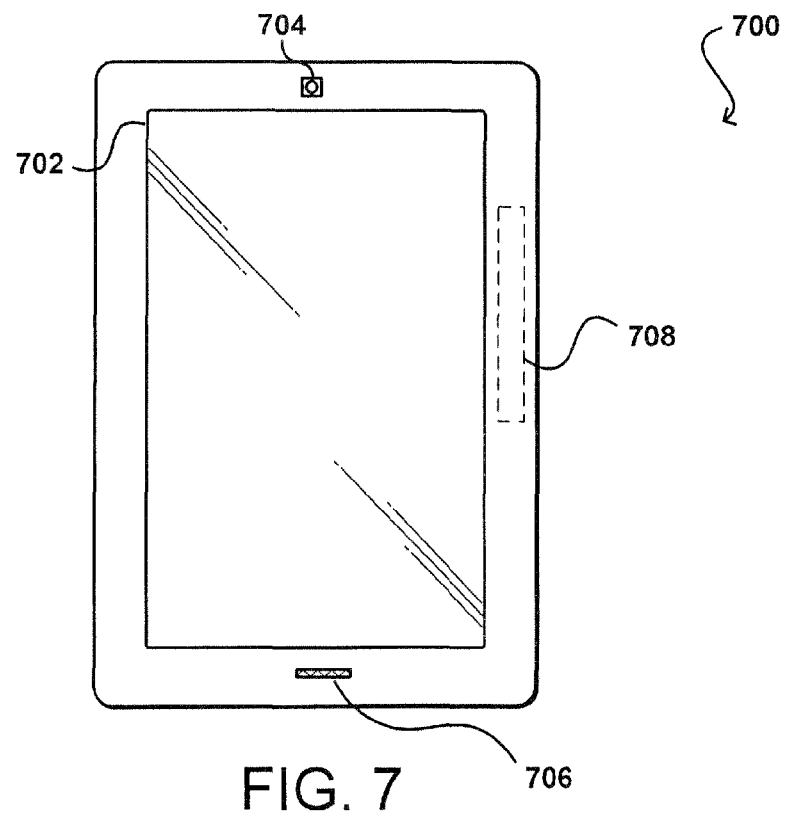
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
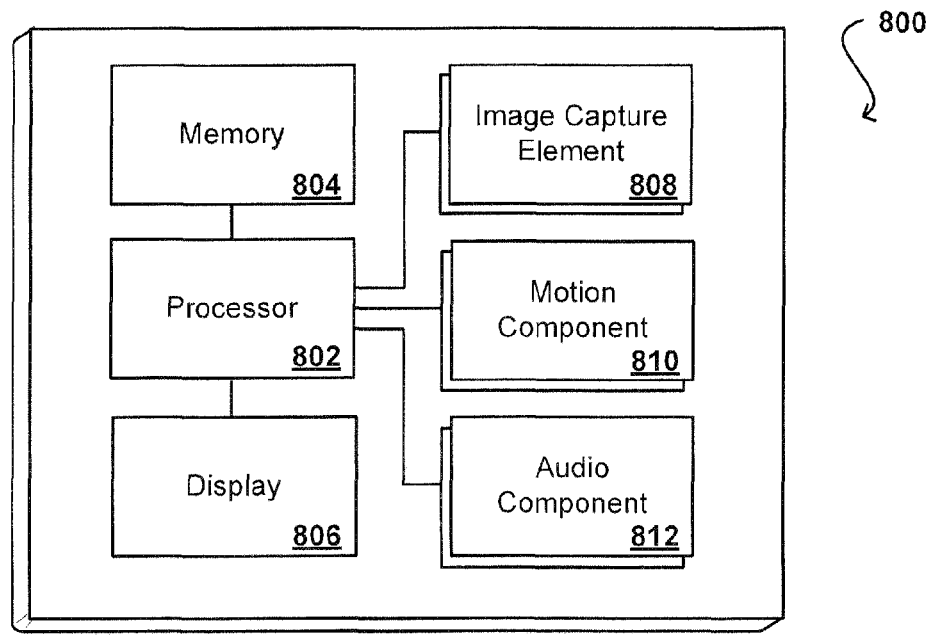
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
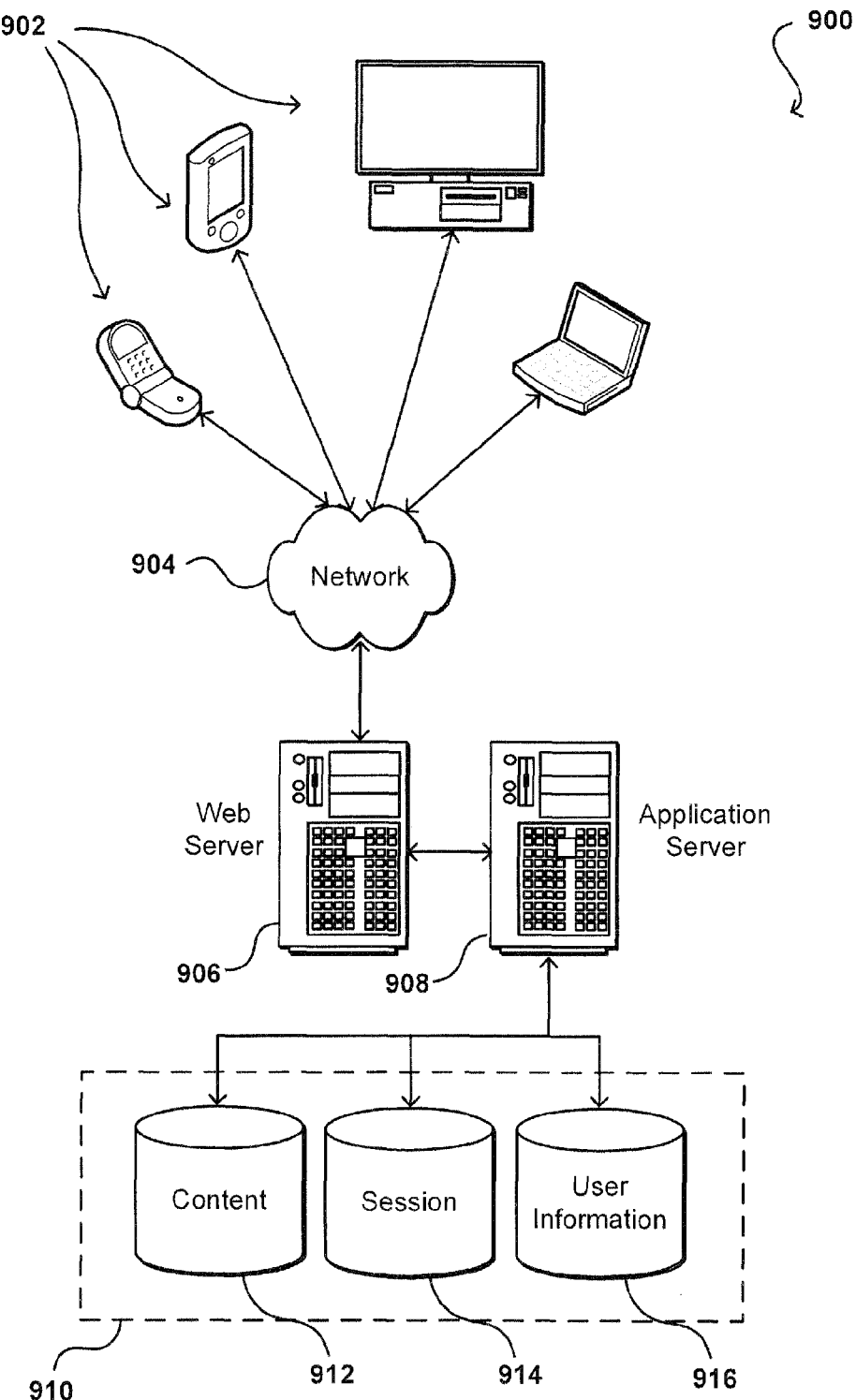
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, JAVA® servers, and business application servers. The server(s) also may be capable of executing programs or scripts in response requests from user devices, such as by executing one or more Web applications that may be implemented as one or more scripts or programs written in any programming language, such as JAVA®, C, C# or C++, or any scripting language, such as Perl, Python, or TCL, as well as combinations thereof. The server(s) may also include database servers, including without limitation those commercially available from ORACLE®, MICROSOFT®, SYBASE®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for utilizing a routing device to handle HTTP requests, comprising:

maintaining a threshold number of persistent connections between the routing device and a backend server, the threshold number of persistent connections being associated with a specified data transport protocol, the threshold number of persistent connections being tracked by the routing device;

periodically transmitting heartbeat data to the backend server to maintain a persistent connection;

receiving an HTTP request originating from a computing device, the HTTP request including information indicative of an identification of the computing device from which the HTTP request originates;

transmitting the HTTP request to the backend server utilizing the persistent connection associated with the specified data transport protocol;

receiving, from the backend server over the persistent connection associated with the specified data transport protocol, a response to the HTTP request, the response having been prepared by the backend server;

identifying that the response received over the persistent connection associated with the specified data transport protocol includes information indicative of a destination for the response; and transmitting the response to the computing device based at least in part on the information indicative of the destination for the response.

2. The computer-implemented method of claim 1, further comprising:

receiving a request from the computing device to establish a transmission control protocol (TCP) connection;
creating an entry for the computing device in a routing table;
storing the entry for the computing device for a specified time period;
assigning a network identification for the computing device, wherein the transmitting of the response to the computing device is based at least in part on the network identification for the computing device; and
establishing the TCP connection for the computing device.

3. The computer-implemented method of claim 2, wherein the storing of the entry for the computing device for the specified time period reduces a need for reestablishing one or more TCP connections by the computing device, thereby improving power consumption for the computing device.

4. The computer-implemented method of claim 1, wherein the response having been prepared by the backend server decreases use of computing resources at the computing device, thereby reducing at least one of latency or processing power associated with rendering one or more webpages by the computing device utilizing the response.

5. The method of claim 1, further comprising:
determining a total number of persistent connections between the routing device and the backend server;
determining an excess number of connections by subtracting the threshold number of persistent connections from the total number of persistent connections; and
dropping the excess number of connections.

6. A computer-implemented method comprising:
maintaining a threshold number of persistent connections between a routing device and a network server, the threshold number of persistent connections being configured to operate with a specified data transport protocol, the threshold number of persistent connections being tracked by the routing device;
periodically transmitting heartbeat data to the network server to maintain a persistent connection;
receiving, from a computing device, a request to communicate with a network resource;
transmitting the request to the network server utilizing the persistent connection configured to operate with the specified data transport protocol, the request to be processed by the network server;
receiving network resource data from the network server via the persistent connection, the network resource data being provided by the network server in response to the request being processed by the network server;
identifying that the network resource data includes information indicative of a destination for the network resource data; and
transmitting the network resource data to the computing device based at least in part on the information indicative of the destination.

7. The computer-implemented method of claim 6, further comprising:
receiving a request from the computing device to establish a transmission control protocol (TCP) connection;
creating an entry for the computing device in a routing table;
storing the entry for a specified time period;
assigning a network identification for the computing device, wherein the transmitting of the network resource data to the computing device is based at least in part on the network identification for the computing device; and
establishing the TCP connection with the computing device.

8. The computer-implemented method of claim 7, further comprising:
receiving information included in the request, the information uniquely identifying the computing device and a port of the computing device through which the TCP connection occurs, wherein the assigning of the network identification for the computing device is based at least in part on the information uniquely identifying the computing device and the port.

9. The computer-implemented method of claim 7, wherein the storing of the entry for the computing device for the specified time period reduces a need for reestablishing one or more TCP connections by the computing device, thereby improving power consumption for the computing device.

10. The computer-implemented method of claim 7, wherein the entry is removed from the routing table when the entry is at least one of a least-used entry within a specified time period or an oldest-inactive entry.

11. The computer-implemented method of claim 10, further comprising:
transmitting, to the computing device associated with the removed entry, a signal indicating to the computing device that the entry for the computing device has been removed; and
disabling the TCP connection with the computing device.

12. The computer-implemented method of claim 11, further comprising:
receiving a data packet, the data packet being received from the computing device that is associated with the removed entry, wherein the transmitting of the signal is performed in response to the receiving of the data packet.

13. The computer-implemented method of claim 6, wherein the request being processed by the network server decreases use of computing resources at the computing device, thereby reducing at least one of latency or processing power associated with rendering one or more webpages by the computing device utilizing the network resource data.

14. The computer-implemented method of claim 6, wherein the network resource data provided by the network server is filtered by the network server to exclude specified inappropriate content.

15. A system comprising:
a routing device;
a network server;
at least one computing device;
at least one processor; and
at least one memory device including instructions that, when executed by the at least one processor, cause the system to:
maintain a threshold number of persistent connections between the routing device and the network server, the threshold number of persistent connections being operable with a specified data transport protocol, the threshold number of persistent connections being tracked by the routing device;
periodically transmit heartbeat data to the network server to maintain a persistent connection;
receive, at the routing device, a request from the at least one computing device to communicate with a network resource;
transmit the request from the routing device to the network server utilizing the persistent connection operable with the specified data transport protocol;

process the request at the network server, the processing including retrieving, by the network server, network resource data from a web server hosting the network resource;

receive, at the routing device, network resource data from the network server via the persistent connection;

identify, at the routing device, that the network resource data includes information indicative of a destination for the network resource data; and transmit the network resource data from the routing device to the at least one computing device based at least in part on the information indicative of the destination.

16. The system of claim 15, wherein the instructions cause the routing device to further:

receive a request from the at least one computing device to establish a transmission control protocol (TCP) connection;

create an entry for the at least one computing device in a routing table;

storing the entry for a specified time period;

assign a network identification for the at least one computing device, wherein the transmitting of the network resource data to the at least one computing device is based at least in part on the network identification for the at least one computing device; and establish the TCP connection with the at least one computing device.

17. The system of claim 15, wherein the processing of the request at the network server comprises determining, by the network server, to perform at least one of a retrieval of network resource data associated with the request, an assembling of the network resource data, an optional modification to the network resource data, or a delivery of the network resource data to the routing device.

18. A routing device comprising:

at least one processor; and a memory device including instructions that, when executed by the at least one processor, cause the routing device to:

maintain a threshold number of persistent connections between the routing device and a network server, the threshold number of persistent connections being configured to operate with a specified data transport protocol, the threshold number of persistent connections being tracked by the routing device;

periodically transmit heartbeat data to the network server to maintain a persistent connection;

receive, from a computing device, a request to communicate with a network resource;

transmit the request to the network server utilizing the persistent connection configured to operate with the specified data transport protocol, the request to be processed by the network server;

receive network resource data from the network server via the persistent connection, the network resource data being provided by the network server in response to the request being processed by the network server;

identify that the network resource data includes information indicative of a destination for the network resource data; and transmit the network resource data to the computing device based at least in part on the information indicative of the destination.

19. The routing device of claim 18, wherein the instructions further cause the routing device to:

receive a request from the computing device to establish a transmission control protocol (TCP) connection;

create an entry for the computing device in a routing table;

store the entry for a specified time period;

assign a network identification for the computing device, wherein the transmitting of the network resource data to the computing device is based at least in part on the network identification for the computing device; and establish the TCP connection with the computing device.

20. A non-transitory computer-readable storage medium including instructions, the instructions when executed by a processor of a routing device causing the routing device to:

maintain a threshold number of persistent connections between the routing device and a network server, the threshold number of persistent connections being configured to operate with a specified data transport protocol, the threshold number of persistent connections being tracked by the routing device;

periodically transmit heartbeat data to the network server to maintain a persistent connection;

receive, from a computing device, a request to communicate with a network resource;

transmit the request to the network server utilizing the persistent connection configured to operate with the specified data transport protocol, the request to be processed by the network server;

receive network resource data from the network server via the persistent connection, the network resource data being provided by the network server in response to the request being processed by the network server;

identify that the network resource data includes information indicative of a destination for the network resource data; and transmit the network resource data to the computing device based at least in part on the information indicative of the destination.

21. The non-transitory computer-readable storage medium of claim 20, wherein the instructions further cause the routing device to:

receive a request from the computing device to establish a transmission control protocol (TCP) connection;

create an entry for the computing device in a routing table;

store the entry for a specified time period;

assign a network identification for the computing device, wherein the transmitting of the network resource data to the computing device is based at least in part on the network identification for the computing device; and establish the TCP connection with the computing device.

22. The non-transitory computer-readable storage medium of claim 21, wherein the storing of the entry for the computing device for the specified time period reduces a need for reestablishing one or more TCP connections by the computing device, thereby improving power consumption for the computing device.

23. The non-transitory computer-readable storage medium of claim 21, wherein the entry is removed from the routing table when the entry is at least one of a least-used entry within a specified time period or an oldest-inactive entry.

24. The non-transitory computer-readable storage medium of claim 23, wherein the instructions further cause the routing device to:

transmit, to the computing device associated with the removed entry, a signal indicating to the computing device that the entry for the computing device has been removed; and disable the TCP connection with the computing device.

25. The non-transitory computer-readable storage medium of claim 24, wherein the instructions further cause the routing device to:
- receive a data packet, the data packing being received from the computing device that is associated with the removed entry, wherein the transmitting of the signal is performed in response to the receiving of the data packet.

\* \* \* \* \*